United States Patent [19]

Pasinski et al.

[11] Patent Number: 4,833,709

[45] Date of Patent: * May 23, 1989

[54] REMOTE TELEPHONE SIGNALING CIRCUITRY AND DEVICE

[75] Inventors: Ralph R. Pasinski, Sunnyvale, Calif.; Sammy L. Ayers, Jr., Ft. Wayne, Ind.

[73] Assignee: Nobell Inc., Sunnyvale, Calif.

[*] Notice: The portion of the term of this patent subsequent to Nov. 17, 2004 has been disclaimed.

[21] Appl. No.: 40,849

[22] Filed: Apr. 20, 1987

Related U.S. Application Data

[63] Continuation-in-part of Ser. No. 739,709, May 31, 1985, Pat. No. 4,707,855.

[51] Int. Cl.[4] .............................................. H04M 1/00
[52] U.S. Cl. .................................... 379/374; 379/434; 379/387; 379/376
[58] Field of Search ............... 379/373, 374, 375, 376, 379/61, 62, 63, 57, 442, 164, 170, 434, 5 L

[56] References Cited

U.S. PATENT DOCUMENTS

| | | | |
|---|---|---|---|
| H118 | 9/1986 | Briggs et al. | 179/84 T |
| 1,901,919 | 3/1933 | McKee | 379/376 X |
| 2,929,883 | 3/1960 | Durbin et al. | 179/84 L |
| 4,379,210 | 4/1983 | Sparber | 179/84 L |
| 4,480,153 | 10/1984 | Festa | 379/374 |
| 4,558,178 | 12/1985 | Yasuda et al. | 379/373 X |
| 4,707,855 | 11/1987 | Pasinski et al. | 379/376 |

FOREIGN PATENT DOCUMENTS 2527875 12/1983 France .................................. 379/88

OTHER PUBLICATIONS

"Technology Illustrated", Oct. 20, 1983.

Primary Examiner—James L. Dwyer
Attorney, Agent, or Firm—Irving M. Weiner; Joseph P. Carrier; Roland W. Norris

[57] ABSTRACT

A remote personalized telephone signaling device comprising a signaling means preferably in the shape of a toy, animal or human figure with movable and sound-producing mechanisms, and an electronic circuit which transmits electromagnetic waves in response to signals in a telephone line to an electronic circuit which receives the waves and activates the signaling means.

16 Claims, 1 Drawing Sheet

REMOTE TELEPHONE SIGNALING CIRCUITRY AND DEVICE

This is a continuation-in-part of application Ser. No. 739,709 filed May 31, 1985 now U.S. Pat. No. 4,707,855.

BACKGROUND OF THE INVENTION

1. Field of the Invention

The present invention relates generally to a remote personalized telephone signaling circuitry and device, and methods of constructing and utilizing same. More particularly, the present invention relates to a remote personalized telephone signaling portion of the device designed for use in addition to, yet physically independent of, a telephone, and the means required to electronically connect the activating portion of the device to a telephone, or alternatively, between a telephone and a telephone outlet.

2. Description of the Relevant Art

The relevant art is exemplified by: U.S. Pat. No. 4,480,153 issued in 1984 to Festa; U.S. Pat. No. 4,379,210 issued in 1983 to Sparber; U.S. Pat. No. 2,929,883 issued in 1960 to Durbin et al.; "Technology Illustrated," Oct. 20, 1983; and United States Statutory Invention Registration H118 published in 1986 and invented by Biggs et al. The cited art, however, fails to teach or suggest features of the present invention.

Beyond these references, the present inventors are unaware of any personalized telephone signaling devices similar to the claimed invention. However, there is a battery-operated toy available which is not a telephone signaling device but which has the external appearance of FIG. 1 herein. Such toy is marketed as "Chubby Bear" by the Alps Company.

SUMMARY OF THE INVENTION

The present invention provides a remote telephone signaling device comprising a wave receiving-signaling portion, a ring detecting-wave transmitting circuit which transmits signals to the wave receiving-signaling portion in response to electrical signals and a telephone line and which is electronically connected to the telephone line. The ring detecting-wave transmitting circuit is extrinsic from the telephone.

The remote telephone signaling device comprises connecting means for connecting the ring detecting-wave transmitting circuit to a telephone line, a signal detecting means for detecting ring-activating signals in a telephone line, for detecting if a receiving party has answered the phone, and for detecting if a calling party has hung up, and a remote receiving-signaling portion comprised of a wave receiving-signaling circuit interconnected with a signaling means activated in response to detected signals.

The signaling means is preferably, although not necessarily, a toy figure with movable and/or sound-producing and/or light-producing features.

It is a principal object of the present invention to provide a personalized alternative to the signaling system associated with phone systems, i.e., loud ringing or buzzing.

Another object of the present invention is to provide a remote telephone signaling device for connecting remote personalized telephone signaling circuitry and device to a telephone.

A further object of the present invention is to provide a remote telephone signaling device which includes in its wave receiving-signaling portion a wave receiving-signaling circuit which activates a signaling means in response to waves transmitted by the ring detecting-wave transmitting circuit.

It is yet another object of the present invention to provide a remote personalized telephone signaling device which quickly connects to any standard telephone and any telephone outlet.

It is a further object of the present invention to provide a remote personalized telephone signaling device in the shape of a toy, animal or human figure with movable and sound producing and/or light producing features.

Other objects, advantages and salient features of the present invention will become apparent from the following detailed description, which, when taken in conjunction with the annexed drawings discloses preferred embodiments of the present invention.

DETAILED DESCRIPTION OF THE PREFERRED EMBODIMENTS

Figures 1, 2, 3:
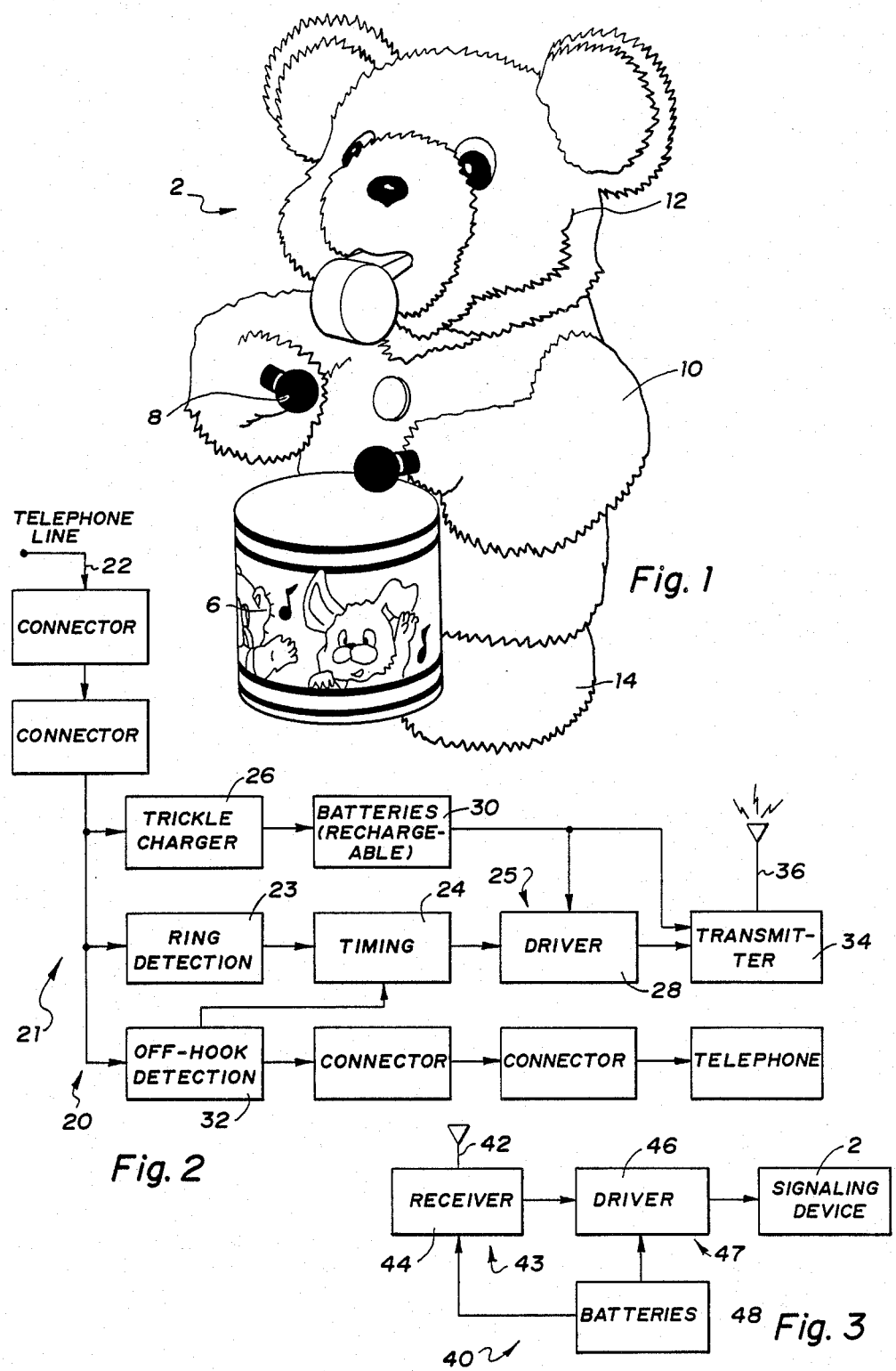
FIG. 1 illustrates a perspective view of a telephone signaling device in the shape of an animated toy figure in accordance with a first embodiment of the present invention.
FIG. 2 illustrates the ring detecting-wave transmitting circuit of a remote signaling device in accordance with the present invention.
FIG. 3 illustrates the wave receiving-signaling circuit of a remote signaling device in accordance with the present invention.

Referring to FIG. 1, there is shown a remote personalized telephone signaling device indicated generally as 2. Preferably, but not necessarily, the telephone signaling device is in the shape of a toy, animal or human figure having movable and sound-producing and/or light-producing features. The telephone signaling device 2 is preferably, but not necessarily, a complete device having mechanical, aesthetic and electrical features.

Mechanical features of the telephone signaling device may include, but not exclusively, a central frame and moving members such as arms, legs, feet, head, doors, wheels, etc. Also included among the mechanical features are sound-producing instruments or mechanisms, such as whistles, bells, drums, horns, music boxes, record or tape playing means, etc.

Electrical features may include, but not exclusively, a power source, motor or driving means, light-producing elements, appropriate connecting means and a remote wave receiving-signaling circuit generally indicated by 40 (see FIG. 3).

Preferably, but not exclusively, power sources for both the ring detecting-wave transmitting circuit, generally indicated by 20 (see FIG. 2) and wave receiving-signaling circuit 40 (see FIG. 3) are batteries, solar cells, transformers and electrical adaptors for electrical outlets.

Aesthetic features may include, but not exclusively, a soft grippable exterior, bright attractive colors, etc.

Referring back to FIG. 1, the remote personalized telephone signaling device shown is a toy bear. External features of this bear include a whistle 4, a drum 6, drumsticks 8, moving arms 10, moving head 12, moving feet 14, and a soft, fuzzy covering material.

The internal features of this bear include a central frame, wave receiving-signaling circuit 40 (see FIG. 3), a motor or driving means 46 (FIG. 3) including appropriate electrical connecting means, appropriate mechanical connecting means allowing movement of the above-discussed parts, and wave receiving-signaling circuit 40 interfaced or otherwise electronically connected with driving means 46.

In use, the ring detecting-wave transmitting circuit 20 (see FIG. 2) would be connected between a telephone 38 (FIG. 2) and a telephone outlet using preferably, but not necessarily, conventional plug-in telephone adaptors. Telephone signaling device 2 is positioned within a predetermined radius of the transmitter's output signal.

Upon receiving a ring-activating signal, ring detecting-wave transmitting circuit 20 (see FIG. 2) transmits a signal to wave receiving-signaling circuit 40 (see FIG. 3) which activates driving means 46 (FIG. 3) whereby head 12 would rock back and forth forcing air through whistle 4, arms 8 would move up and down thereby contacting drumsticks 8 with drum 6, and feet 14 would turn the device from side to side. A combination of such movements and sound created thereby would pleasantly inform a receiving party that he or she should answer telephone 38 (FIG. 2).

Once the receiving party has answered telephone 38(see FIG. 2), ring detecting-wave transmitting circuit 20 (FIG. 2) stops transmitting a signal to receiving-signaling circuit 40 (FIG. 3), deactivating driving means 46 (FIG. 3) whereby signaling device 2 stops signaling.

Similarly, if the receiving party is not present to answer telephone 38 (see FIG. 2) and the calling party hangs up, ring detecting-wave transmitting circuit 20 (FIG. 2) stops transmitting its signal to receiving circuit 40 (FIG. 3) which deactivates driving means 46 (FIG. 3) and turns off signaling device 2.

If the electrical power source fails, i.e., if batteries die, a short circuit occurs in the electrical connecting means, etc., the connection between telephone 38 (see FIG. 2) and the telephone outlet will not be affected because this connection is through the ring detecting-wave transmitting circuit 20 (FIG. 2).

Similarly, a sounding mechanism integrally included with the telephone is not affected by the presence of the ring detecting-wave transmitting circuit 20 (see FIG. 2) or the wave receiving-signaling circuit 40 (FIG. 3). The integral sounding mechanism may be used in addition to the signaling device 2, or if desired may be turned off so that only the signaling device 2 is operative.

Referring to FIG. 2, there is shown ring detecting-wave transmitting circuit 20 which may include, but not exclusively, connecting means 22 for connecting ring detecting-wave transmitting circuit 20 to the telephone line outlet in telephone 38, respectively, and means for activating and deactivating transmitter driving means 28 which activates or deactivates transmitting means 34.

Means for activating and deactivating transmitter driving means 28 may include, but not exclusively, a signal detecting portion generally indicated by 21 and an activating portion generally indicated by 25.

Preferably, but not exclusively, signal detecting portion 21 includes a ring-activating signal detecting component 23 which may, but not necessarily, be an integrated circuit.

Preferably, but not exclusively, activating portion 25 includes timing means 24, transmitter driving means 28 and transmitting means 34. Transmitter driving means 28 and transmitting means 34 are powered by rechargeable batteries 30 which receive a continuous charge from trickle charger 26.

Referring now to FIG. 3, there is shown remote wave receiving-signaling circuit 40 which may include, but not exclusively, an electromagnetic wave receiving portion generally indicated by 43 and a driving portion generally indicated by 47.

Preferably, but not exclusively, electromagnetic wave receiving portion 43 includes receiving antenna 42 and receiving means 44. Preferably, but not exclusively, driving portion 47 includes driving means 46. Remote wave receiving-signaling circuit 40, operatively interconnected with signaling device 2 (see FIG. 1), is powered by and includes a power supply means which may be one or more dry-cells, photovoltaic units, etc. According to the preferred embodiment, circuit 40 is powered by conventional dry cells 48.

In use of the preferred embodiment depicted by Figures 2 and 3, a ring-activating signal comes through connecting means 22 to the ring-activating signal detecting component 23 and to the telephone 38. The detecting component 23 then generates a series of electrical pulses which activate transmitter driving means 28 to cause the radiation of appropriate electromagnetic waves from transmitting means 34 via transmitting antenna 36.

The electromagnetic waves radiated from ring detecting-wave transmitting circuit 20 are received by receiving antenna 42 of receiving-signaling circuit 40 which activates driving means 46 to animate and illuminate signaling device 2 (see FIG. 1).

When a user lifts the receiver (not shown) of telephone 38, off-hook detection means 32 detects the lifting of the receiver and signals timing means 24 to stop its signal to driving means 28, which in turn stops the signal transmitted from transmitting means 34. With the discontinued emission of electromagnetic waves from ring detecting-wave transmitting circuit 20, receiving means 44 stops sending generating pulses to driving means 46, which in turn stops sending driving signals to signaling device 2 (see FIG. 1).

Although various advantageous embodiments have been chosen to illustrate the invention, it would be understood that those skilled in the art that various changes and modifications can be made therein without departing from the spirit and scope of the invention as defined in the appended claims.

We claim:

1. A remote telephone signaling device, comprising:
   signaling means adapted to provide audio and visual signals;
   said visual signal including a movable portion of said signaling means;
   a ring detecting-wave transmitting circuit; and
   a wave receiving-signaling circuit operatively interconnected with said signaling means for activating and deactivating said signaling means;
   said ring detecting-wave transmitting circuit being extrinsic from an associated telephone; and
   said remote telephone signaling device being remote and not mechanically connected with said ring detecting-wave transmitting circuit or physically connected with an associated telephone.

2. A remote telephone signaling device according to claim 1, wherein:
   said ring detecting-wave transmitting circuit comprises:

connecting means for connecting said circuit to a telephone line and a telephone;

a signal detecting portion for detecting electrical signals on said telephone line; and an activating portion operatively connected to said signal detecting portion which selectively transmits electromagnetic waves.

3. A remote telephone signaling device according o claim 1, wherein:

said wave receiving-signaling circuit comprises:

an electromagnetic wave receiving portion for receiving electromagnetic waves transmitted by said first means; and a driving portion operatively connected to said receiving portion which activates and deactivates said telephone signaling device in response to transmitted waves received by said electromagnetic wave receiving portion.

4. A remote telephone signaling device according to claim 2, wherein:

said connecting means includes adaptors for quickly and easily connecting said telephone signaling device between a telephone line outlet and said associated telephone.

5. A remote telephone signaling device according to claim 1, wherein:

said signaling means includes a toy, animal or human figure with movable and sound-producing features.

6. A remote telephone signaling device according to claim 4, wherein:

said signaling means includes a toy, animal or human figure with movable and sound-producing features.

7. A remote telephone signaling device according to claim 1, wherein:

said signaling means includes light-producing features.

8. A remote telephone signaling device according to claim 5, wherein:

said signaling means further includes light-producing features.

9. A remote telephone signaling device according to claim 6, wherein:

said signaling means further includes light-producing features.

10. A remote telephone signaling device according to claim 1, wherein:

said ring detecting-wave transmitting circuit includes a rechargeable power supply means.

11. A telephone signaling device according to claim 2, wherein:

said ring detecting-wave transmitting circuit includes a rechargeable power supply means.

12. A telephone signaling device according to claim 3, wherein:

said wave receiving-signaling portion includes a power supply means.

13. A telephone signaling device according to claim 2, wherein:

said wave receiving-signaling circuit includes a power supply means.

14. A remote telephone signaling device, comprising, in combination:

a telephone line terminating in a first connector;

a telephone having a telephone cord terminating in a second connector which is adapted to mechanically and electrically mate with said first connector;

a ring detecting-wave transmitting circuit electronically and mechanically interconnected between said first connector and said second connector;

a signaling portion;

a wave receiving-signaling circuit interconnected with said signaling portion having no mechanical connection with said telephone line and said ring detecting-wave transmitting circuit; nor any physical connection with said telephone; and means for producing a visual and audible signal to alert a user that a telephone call is incoming;

said visual signal including a movable portion of said signaling portion.

15. A remote telephone signaling device according to claim 14, wherein:

said means for producing a visual and audible signal has the shape of an animal, human or toy.

16. A remote signaling telephone device according to claim 14, wherein:

said ring detecting-wave transmitting circuit includes a rechargeable power supply means.

* * * * *